(12) United States Patent
Keller et al.

(10) Patent No.: US 7,013,721 B2
(45) Date of Patent: Mar. 21, 2006

(54) METHOD FOR DETERMINING THE LOAD EXERTED ON A VEHICLE TIRE

(75) Inventors: Lothar Keller, Friedrichsdorf (DE); Martin Griesser, Eschborn (DE); Andreas Köbe, Bensheim (DE); Peter Säger, Friedrichsdorf (DE)

(73) Assignee: Continental Teves AG&Co., oHG, (DE)

( * ) Notice: Subject to any disclaimer, the term of this patent is extended or adjusted under 35 U.S.C. 154(b) by 72 days.

(21) Appl. No.: 10/485,015

(22) PCT Filed: Jul. 30, 2002

(86) PCT No.: PCT/EP02/08478

§ 371 (c)(1),
(2), (4) Date: Jan. 28, 2004

(87) PCT Pub. No.: WO03/016115

PCT Pub. Date: Feb. 27, 2003

(65) Prior Publication Data

US 2005/0172709 A1      Aug. 11, 2005

(30) Foreign Application Priority Data

Jul. 30, 2001    (DE) .............................. 101 37 029

(51) Int. Cl.
*G01M 17/02* (2006.01)
(52) U.S. Cl. .................................................. 73/146
(58) Field of Classification Search ............ 73/146, 73/146.2–146.8; 340/442–448
See application file for complete search history.

(56) References Cited

U.S. PATENT DOCUMENTS

| | | | | |
|---|---|---|---|---|
| 4,224,597 A | * | 9/1980 | DiCecio | 340/444 |
| 5,578,984 A | * | 11/1996 | Nakajima | 340/444 |
| 5,747,686 A | * | 5/1998 | Nishihara et al. | 73/146.2 |
| 5,771,480 A | * | 6/1998 | Yanase | 701/80 |
| 5,793,285 A | * | 8/1998 | Wehinger | 340/443 |
| 5,842,755 A | * | 12/1998 | Sugimoto et al. | 303/186 |
| 6,321,180 B1 | * | 11/2001 | Hubbell, Jr. | 702/191 |
| 6,756,891 B1 | * | 6/2004 | Oshiro | 340/444 |

FOREIGN PATENT DOCUMENTS

| | | |
|---|---|---|
| DE | 4009540 | 9/1991 |
| DE | 4228894 | 3/1994 |
| DE | 19611364 | 10/1997 |
| DE | 19807880 | 9/1999 |
| DE | 19917034 | 11/2000 |
| DE | 10058099 | 5/2002 |
| EP | 0719663 | 7/1996 |
| JP | 03135810 | 6/1991 |
| JP | 06115328 | 4/1994 |

* cited by examiner

Primary Examiner—William Oen

(57) ABSTRACT

A method for determining the load exerted on the tire of a motor vehicle or to monitor the tire pressure, wherein during operation of the vehicle the pressure in the individual wheels is detected and the rotational behavior of the individual wheels is monitored, and wherein load distribution characteristic quantities are determined by comparing the rotational behavior or changes in said rotational behavior of the individual wheels during given driving conditions taking onto account preset or learned variables. Ultimately, the load exerted on the tires or pressure loss is determined from the tire pressure and the load distribution characteristic quantities.

19 Claims, 4 Drawing Sheets

Tire Pressures Correspond to Nominal Condition
L*: Maximum Authorized Payload

1: $p_{VR} - p_{soll} = \Delta p$ and $p_{HR} - p_{soll} = \Delta p$ with $\Delta p < 0$ case 2: $p_{VR} = p_{soll}$ and $p_{HR} - p_{soll} = \Delta p$ with $\Delta p < 0$ case 3: $p_{VR} - p_{soll} = \Delta p < 0$ and $p_{HR} - p_{soll} = \Delta p > 0$ case 4: $p_{VR} - p_{soll} = \Delta p$ and $p_{HR} - p_{soll} = \Delta p$ with $\Delta p > 0$ case Tire Pressures Differ from Nominal Condition
L*: Maximum Authorized Payload

METHOD FOR DETERMINING THE LOAD EXERTED ON A VEHICLE TIRE

TECHNICAL FIELD

The present invention generally relates to tires and more particularly relates to a method for determining the charge or load exerted on the tires of a motor vehicle and for monitoring tire pressure.

BACKGROUND OF THE INVENTION

It is disclosed in the art to determine in motor vehicles the tire pressure or a quantity representative of the tire pressure by means of pressure measuring systems (TPMS=Tire Pressure Measuring System) based on a pressure sensor or, without using pressure sensors, by means of systems based on the wheel speed (DDS=Deflation Detecting System).

In the so-called TPMS system, the measured pressure along with the temperature is sensed by means of sensors arranged in the tire and transmitted in a wireless manner to a receiver installed in the vehicle. The pressure data is evaluated and the pressure prevailing in the individual tires is determined in a control device.

For the conventionally used safety and motor vehicle control systems such as ABS, TCS, ESP, DDS, etc., a relatively exact knowledge of the rotational behavior of the individual vehicle wheels is necessary. Nowadays, vehicles are therefore equipped with passive or active wheel speed sensors, which supply the required input signals for the various safety and control systems. Thus, the tire pressure that cannot be derived directly from the wheel speeds is determined indirectly by way of the dynamic rolling circumference of the individual vehicle wheel e.g. by means of the DDS system (Deflation Detecting System). The load dependency of the dynamic rolling circumference rather must be considered a disturbance variable in pressure loss detection by means of DDS.

A method for measuring the load exerted on the tire which is determined, among others, by the actual tire pressure and the wheel load or wheel load distribution during operation of the vehicle, meaning during driving, has not been known so far. It is not sufficient to monitor the tire pressure loss because the charge or load exerted on the tire, to a larger extent than the tire pressure, is responsible for the safety and durability of the tire and because different tire pressures are required for a comfortable driving behavior and ideal charge exerted on the tire depending on the wheel load or wheel load distribution.

SUMMARY OF THE INVENTION

In view of the above, an object of the present invention is to provide a method that allows detecting the charge or load exerted on a tire under different conditions, in particular in the event of different wheel load or wheel load distribution.

A method of this type renders it possible to exclude overload on the tires, safeguard durability of the tires, and increase the general safety of vehicle and driver.

The method of the present invention
determines the pressure in the individual tires during operation of the vehicle and
monitors the rotational behavior of the individual wheels and
determines the load distribution characteristic quantities of the tires by comparing the rotational behavior or the changes of the rotational behavior of the individual wheels in defined driving conditions in consideration of preset or learnt quantities, and
deriving the charge or load exerted on the tires and pressure loss from the tire pressure and the load distribution characteristic quantities.

The invention is based on the knowledge that the variable, i.e. the charge exerted on the tire, influencing the safety and lifetime of a tire to a great degree can be determined by way of measuring the pressure and monitoring the wheel rotational behavior. The dependence of the dynamic rolling circumference on the tire pressure and the wheel load is e.g. known from the development of wheel-speed based pressure monitoring systems (DDS). By comparing the wheel speeds of the various vehicle wheels and evaluating the deviations it is possible to find out parameters representative of the charge exerted on the tires when knowing the tire pressure—e.g. measured by TPMS.

According to an embodiment of the invention, a pressure measuring system (such as TPMS=Tire Pressure Measuring System) based on a pressure sensor system is used to determine the tire pressure, wheel speed sensors are used to monitor the wheel rotational behavior, and a system based on the evaluation of wheel speed information is used to determine the load distribution characteristic quantities, the latter system corresponding in its mode of functioning to a system (DDS) for detecting the conditions of the dynamic rolling circumferences of the individual tires. Thus, systems known in the art are used to realize the detection of the exerted charge.

According to another favorable embodiment of the invention, the rotational speed of a front wheel is compared to the rotational speed of a rear wheel at the same vehicle speed or approximately identical vehicle speed (e.g. vehicle reference speed), is evaluated for producing a load distribution characteristic quantity, and the value or the change of the load distribution characteristic quantities in defined driving situations is taken into account for calculating the charge or load exerted on the tires or the pressure loss.

It has proven especially suitable for determining the load distribution characteristic quantities to produce in each case a quotient made up of the front-wheel and rear-wheel speeds of the wheels (or the corresponding rotational speeds) of the same vehicle side and to evaluate the value or the variations of the load distribution characteristic quantities at (approximately) equal vehicle speed or in consideration of the vehicle speed. The quotients $F_{FL}/F_{RL}$ or $F_{FR}/F_{RR}$, which can be linked to each other additionally to enhance the 'safety' of detection and the accuracy, are appropriate quantities to determine the load distribution. Other types of combinations, e.g. the diagonal, or corresponding other types of functional relationships, such as especially quotients of speed sums, are also possible. This feature depends on the respective concept of the vehicles and the monitoring systems.

Further, it is arranged to respectively compare and evaluate the speeds of the wheels of an axle for detecting relative load distribution variations vertically to the driving direction, for example as a result of boarding of a passenger.

To increase the measuring and evaluation accuracy it is also possible or even preferred to make the rolling times of the wheel instead of the wheel revolutions or wheel speeds the basis for the calculations.

The nominal values or normal values of the load distribution characteristic quantities applying to a defined charge or load, e.g. partial load or full load, can be input manually, or the system can be designed so that the corresponding nominal or normal values are detected automatically as soon as defined conditions are satisfied.

Further, it has proven expedient to determine the values for the load distribution characteristic quantities that apply to partial load operations in defined driving situations, for example, with (at least approximately) freely rolling wheels, at constant straight driving, etc., or by taking into account the driving torque into the calculations by statistic analysis or by evaluation of criteria indicative of a partial load operation. Although characteristic quantities obtained in driving situations with freely rolling wheels are generally more precise and, therefore, can be evaluated in a preferred fashion, it is frequently additionally suitable, for reasons of a number of data limited in practice, to equally include data from driving situations where the wheels do not run freely. In the last-mentioned cases, the data obtained must be cleared from the influence of the respective driving parameter on the characteristic quantity.

The necessary information for determining the driving situation is preferably obtained from a per se known ABS or ESP system.

The point of time where a normal condition, meaning a defined condition or desired condition, prevails can be fixed according to the invention by manual or independent release of a start signal, e.g. after adjustment of a predetermined inflation pressure and load condition. After a changing of tires or after the first assembly one will not be able in many cases to avoid manually triggering a reset action or a start signal.

According to another embodiment of the method of the invention, values for the load distribution characteristic quantities and the associated tire pressure values are learnt and memorized during predetermined driving conditions. These learnt characteristic quantities can be established in particular in dependence on a driving parameter, such as in dependence on the speed. In the last-mentioned case it is particularly suitable when successive intervals for the driving parameter are produced and a learning value is determined for each interval.

Learning processes are preferably used also for the system based on the evaluation of wheel speed data. In particular, the desired or normal condition is learnt in a learning phase, especially by determining and memorizing quantities representative of the rolling circumference of the wheels. The quantities representative of the rolling circumference of the wheels may also be proportional factors of different wheel pairs. Depending on the case of application, the proportional factors may of course also be determined by different calculations or a different type of comparison of the individual wheels.

According to another preferred embodiment of the invention, the system based on evaluating wheel speed data determines after the learning phase variations of the quantities representative of the rolling circumference of the wheels by comparison of current characteristic quantities representative of the rolling circumference of the wheels with learnt quantities indicating of the rolling circumference of the wheels. The difference between the learnt quantity and the current quantity is a standard of the wheel load in this case.

The system based on the evaluation of the wheel speed data may be extended with little effort to become a complete DDS, i.e. a system capable of detecting tire pressure loss irrespective of the pressure measuring system (TPMS). In this system, a comparison can be made and evaluated between the tire pressure loss determined by the pressure sensor system (TPMS) and the tire pressure loss detected on the basis of the DDS system. When the tire pressure loss found out on the basis of the wheel speed data is by a defined amount higher than the tire pressure loss detected on the basis of the pressure sensor system, a compression triggered by increase of the wheel load can be concluded from that fact.

DETAILED DESCRIPTION OF THE PREFERRED EMBODIMENTS

Figure 1:
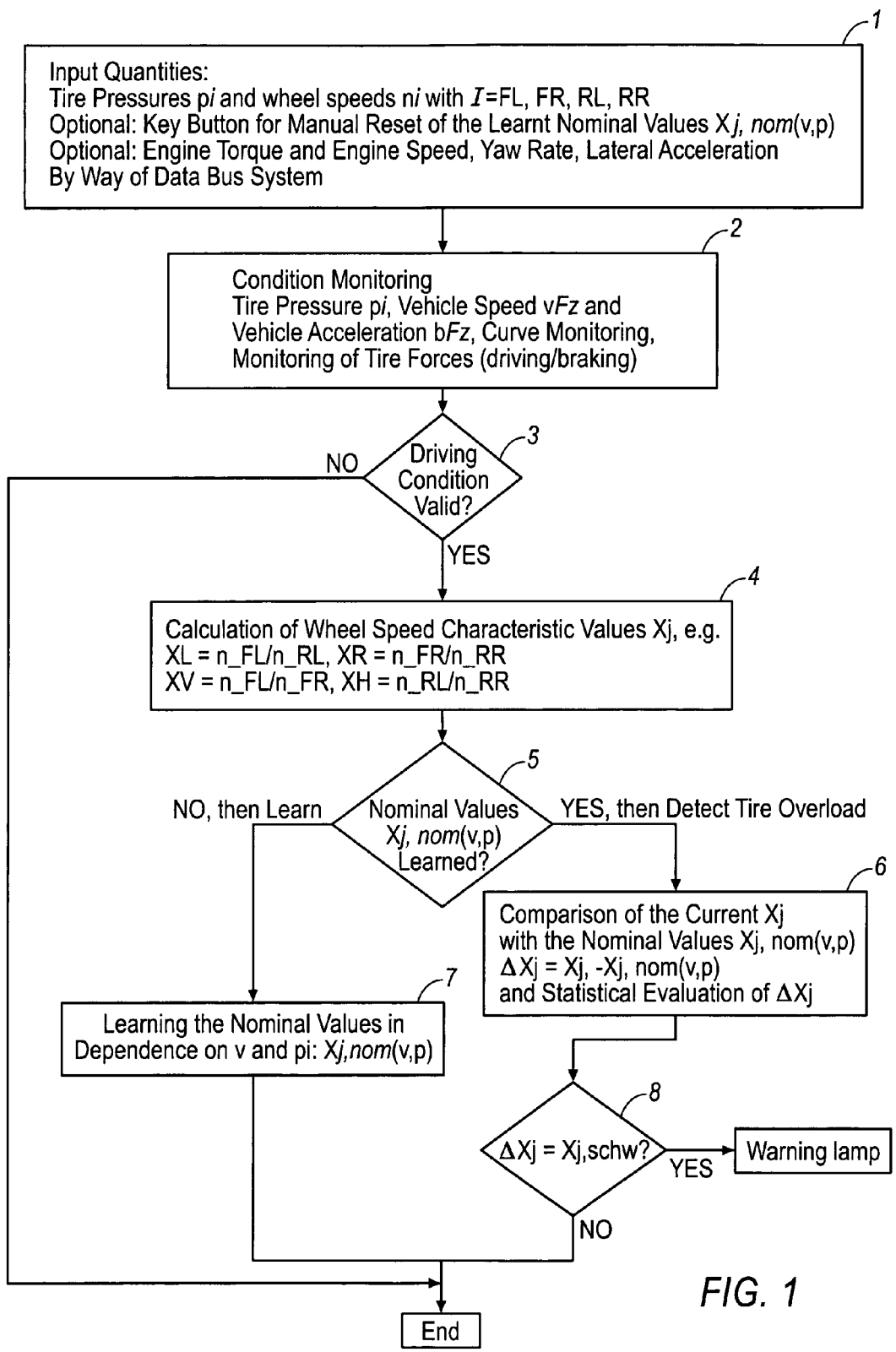
FIG. 1 is a schematic view of a flow chart for illustrating the basic principle of an embodiment of the method of the invention.

FIG. 1 serves to illustrate the mode of functioning of the method of the invention. The method is based on the evaluation of the individual tire pressure $p_i$ (the index i=1 ... 4 designates the respective wheel) and of the rotational behavior or the wheel speeds FL, FR, RL and RR as input quantities of a system for implementing the method of the invention. Block 1 symbolizes this feature.

In the embodiment described herein, the current condition of the tires (pressure), the wheels (rotational behavior) and the vehicle (acceleration, driving situation, etc.) and variations of these quantities are determined and monitored in block 2.

After a 'query' of the current driving condition in step 3, wheel speed parameters (in this example wheel revolutions 'n' instead of wheel speeds 'v' are compared with each other) are calculated as indicated and subsequently checked in 5.

Learning of the nominal values is continued (represented by 7), or if tire overload was detected (alternative 'yes' of branching 5) a warning function is triggered or a warning lamp switched on after comparison of the current values with the desired values in operator 6 and exceeding of a predetermined threshold (branching 8).

The individual operations and decisions in the sequence of the method of the invention are mentioned in FIG. 1 in the previously explained steps 1–8.

Figure 2:
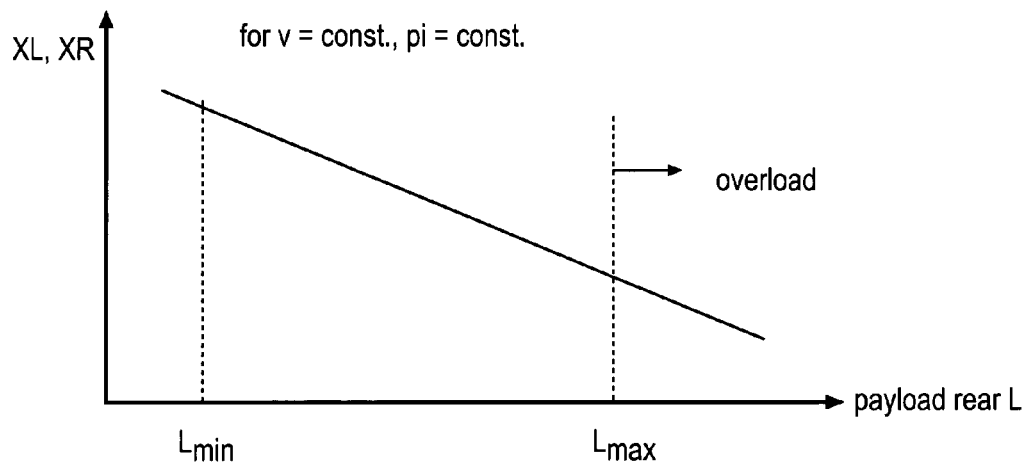
FIG. 2 is a diagram plotting the dependency of a load distribution characteristic quantity on the payload.

FIG. 2 shows the process or the dependency of characteristic quantities XL, XR on the payload (payload L rear). This concerns a vehicle where the load exerted on the rear axle is increased by the payload.

To determine the load distribution characteristic quantities XL and XR, e.g. the revolutions or speeds of the wheels of respectively one vehicle side are taken into account.

$$XL = F_{FL}/F_{RL} \text{ and } XR = F_{FR}/F_{RR}$$

then applies. The characteristic curve XL, XR=f (payload L rear) according to FIG. 2 applies to a constant vehicle speed v and constant pressure in the individual wheels. $L_{min}$ is the load condition with the least possible charge (only driver, no additional load) and $L_{max}$ is the load condition starting with which a warning is signaled.

Figure 3:
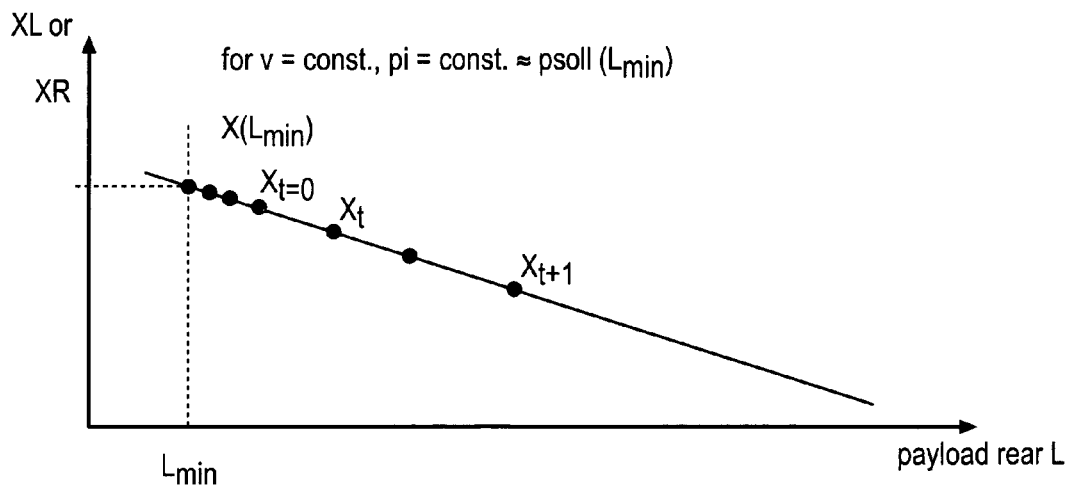
FIG. 3 is a diagram, in the same illustration as in FIG. 2, for explaining the detection of the partial load condition.

FIG. 3 serves to illustrate the learning processes of the characteristic quantities XL and XR for the minimum load condition of a vehicle, which is basically loaded rearwards. The load distribution characteristic quantities $XL_t$, $XR_t$, $XF_t$ and $XR_t$ are acquired, memorized and analyzed statistically at different times along with the associated pressure values. It may be assumed that the condition occurs repeatedly at partial load or minimum load during operation of a vehicle, for what reason the value of the corresponding load distribution characteristic quantity can be recognized by statistical evaluation or inference function.

For each starting cycle of the vehicle (time between the engine and engine switch-off) characteristic quantities $XL_t$, $XR_t$, $XF_t$ and $XR_t$ are respectively determined. Also the associated tire pressure $p_i$ is stored apart from the characteristic quantities. With the simplifying assumption that the vehicle is operated also in unladen state (only driver without additional load) during several ignition cycles, a nominal value $X_{nom}$ can be determined from value $X_t$ in a particularly simple fashion by way of a maximum function.

FIG. 4 is used to explain the charge detection and the corresponding load distribution characteristic quantities in different situations and at different tire pressures. The respectively applicable marginal conditions are mentioned in FIG. 4.

Figure 4A:
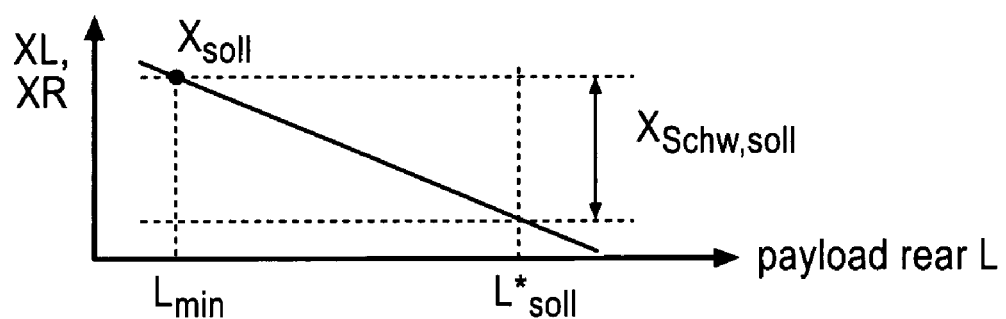
FIGS. 4A and 4B show several diagrams for illustrating the principle of the charge detection at the example of a vehicle whose payload basically burdens the rear axle.
Figure 4B:
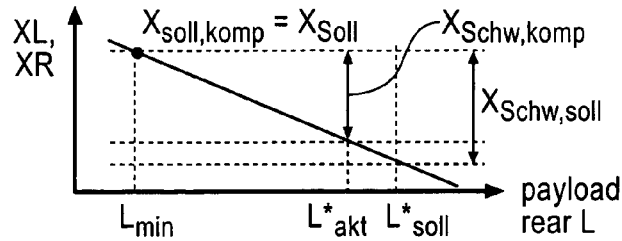
Figure 4B:
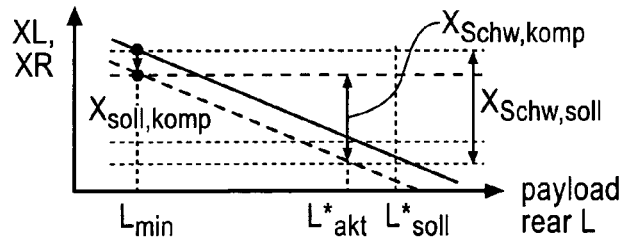
Figure 4B:
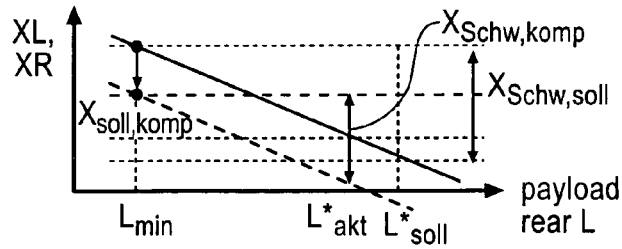
Figure 4B:
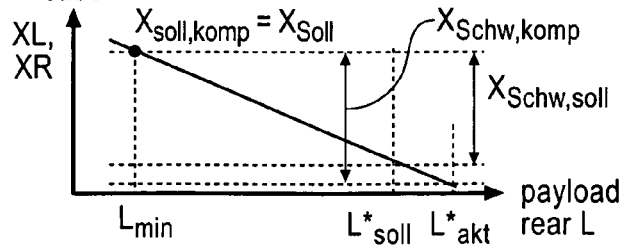

In FIG. 4a, a detection threshold $X_{thresh,nom}$ is provided which may remain uncompensated in the beginning because the tire pressure of all wheels corresponds to the nominal pressure in the necessary accuracy. When the detection threshold is exceeded, the system will issue an alarm. In the partial pictures b) situations are illustrated in which one or more wheels exhibit(s) a lower pressure $\Delta p<0$. Because a wheel with minimum pressure can no longer be burdened to the same extent as a wheel with nominal pressure, it is necessary to compensate the detection threshold in response to pressure to lower values to $X_{thresh,comp}$. In doing so, it is suitable to execute the adaptation according to the lowest pressure per vehicle side. As a result, the warning of an excessive load is activated already at a lower load. In the illustrated cases 2 and 3, the tire pressures of the wheels used to determine X differ from each other so that also a compensation from $X_{nom}$ to $X_{nom,comp}$ is necessary.

The above-described pressure-responsive compensation of the detection thresholds depends on the type of tire used. It has shown that compensation with a sufficient accuracy may preferably be performed with the help of constant values responsive to the vehicle type. This is possible because only defined known types of tires are generally allowed for operation of a defined type of vehicle.

A method based on pressure measurement (TPMS) principally has the shortcoming that only one pressure information can be supplied to the driver. To what extent the tire is loaded, however, does not only depend on the pressure but also on the current load that is unknown. Therefore, it is the driver's own responsibility to now as before ensure the correct inflation pressure associated with the load. Admittedly, it is frequently possible to infer tire overload by means of the temperature measurement in the TPMS sensor that is mostly executed simultaneously. However, the temperature in the sensor on the wheel rim is subject to various disturbances. Therefore, these measurements do not indicate the temperature load of the tire (at the critical positions) with a sufficient rate of safety.

A DDS system typically has the disadvantage that the absolute tire pressure is unknown. However, it has the advantage that a change in the rolling circumference caused by the changed compression of a tire can be detected. This compression of the tire must be regarded as the decisive standard of the charge of the tire. In practical operations, it cannot be distinguished with DDS whether a changed inflation pressure or a changed wheel load provoked a change in the compression. Consequently, the main disturbance variable in a tire pressure control by way of DDS is the load.

The method of the invention allows overcoming both the shortcomings of a prior art TPMS and the deficiencies of a DDS system. The method of the invention is based on the combination of a measuring method based on a pressure sensor system with a method based on monitoring and evaluating the wheel revolutions, whose physical bases found on the dynamic rolling circumferences of the individual tires and on the relative variations of these rolling circumferences in the event of wheel load changes.

The inflation pressure is exactly recognized by way of the pressure sensor system. With respect to the wheel rotational behavior, the charge of the tire is monitored on account of pressure and load variations. This combination thus offers the possibility of defining the tires' charge. Thus, the driver can be freed from the responsibility for the tire to a great extent. Compared to a purely pressure-sensor based pressure measuring system such as TPMS, the solution of the invention offers the additional advantage that the system can adapt on its own in conformity with load variations, that means the driver is not required to inform TPMS that a new nominal pressure value applies load-responsively.

The method of the invention uses in a similar fashion functions and findings obtained in connection with pressure loss detection methods that operate on the basis of data of wheel speed sensors.

The 'normal condition', i.e. the inflation pressure correctly adjusted with respect to the current load condition (known from TPMS) can be sent to the system e.g. by the driver pushing a button, or e.g. corresponding to the example in FIG. 3 by means of a maximum function without any effort on the driver's part. Analogously to DDS, the rolling circumferences are initially determined in a learning phase. Subsequently, after the learning phase, the actual condition is compared to the learnt condition. This comparison furnishes data about augmented compressions or charges exerted on the tire. The computation approach is in some respects similar to the detection of pressure loss by way of DDS. The decision about the warning of the driver regarding an overload of the tire is taken by a combined evaluation of current inflation pressure and compression.

The invention comprises a method for determining or monitoring the tires' charge on the basis of a combination of a direct-measuring tire inflation pressure control system (TPMS) and a system for monitoring the wheel rotational behavior and the rolling circumferences similar to DDS.

Preferably, the method is implemented in a motor vehicle, in particular a passenger vehicle.

The invention claimed is:

1. Method for determining the load exerted on the tire of a motor vehicle and for monitoring the tire pressure, comprising the steps of:
   determining the pressure in the individual tires during operation of the vehicle,
   monitoring the rotational behavior of the individual wheels,
   determining load distribution characteristic quantities by comparing the rotational behavior or the changes of the rotational behavior of the individual wheels in defined driving conditions in consideration of preset or learnt quantities, and
   deriving the load exerted on the tires and pressure loss from the tire pressure and one or more load distribution characteristic quantities.

2. Method as claimed in claim 1, wherein a pressure measuring system (TPMS) based on a pressure sensor system is used to determined the tire pressure, and wherein wheel speed sensors are used to monitor the wheel rotational behavior, and wherein a system based on the evaluation of wheel speed information is used to determine the load distribution characteristic quantities.

3. Method as claimed in claim 2, wherein the rotational speed of a front wheel is compared to the rotational speed of a rear wheel at the same vehicle speed or approximately identical vehicle speed and evaluated for producing a load distribution characteristic quantity, wherein the value or the change of the load distribution characteristic quantities in defined driving situations is taken into account for calculating the load exerted on the tires and the pressure loss.

4. Method as claimed in claim 3, wherein determining the load distribution characteristic quantities, includes using a quotient made up of the front-wheel and rear-wheel speeds of the wheels of the same vehicle side ($V_{FL}/V_{RL}$; $VF_{FR}/V_{RR}$), and wherein the value or the variations of the load distribution characteristic quantities are evaluated at (approximately) equal vehicle speed or as a function of at least one driving parameter.

5. Method as claimed in claim 4, wherein the speeds of the wheels of one axle ($V_{FL}/V_{RL}$ or $V_{FR}/V_{RR}$) are compared and evaluated for detecting relative load distribution changes vertically to the driving direction.

6. Method as claimed in claim 4, wherein said at least one driving parameter includes vehicle speed.

7. Method as claimed in claim 4, wherein said at least one driving parameter includes tire pressure.

8. Method as claimed in claim 4, wherein said at least one driving parameter includes wheel torque.

9. Method as claimed in claim 4, wherein the nominal values or normal values of the load distribution characteristic quantities applying to a defined load, are input manually, or are detected automatically as soon as defined conditions are satisfied.

10. Method as claimed in claim 9, wherein the values for the load distribution characteristic quantities that apply to the partial load operations are determined for the load distribution characteristic quantities in defined driving situations, or by taking into account the driving torque, by statistic analysis or by evaluation of criteria indicative of a partial load operation.

11. Method as claimed in claim 10, wherein the point of time where a normal condition prevails is fixed by manual or automatic release of a start signal.

12. Method as claimed in claim 11, wherein values for the load distribution characteristic quantities and the associated tire pressure values are learnt and memorized during predetermined driving conditions.

13. Method as claimed in claim 2, wherein the system based on evaluation of the wheel speed data learns the desired or normal condition in a learning phase.

14. Method as claimed in claim 13, wherein the quantities representative of the rolling circumference of the wheels are used as proportional factors of different wheel pairs.

15. Method as claimed in claim 14, wherein the system based on evaluating wheel speed data determines after the learning phase variations of the quantities representative of the rolling circumference of the wheels by comparison of current characteristic quantities representative of the rolling circumference of the wheels with learnt quantities indicating of the rolling circumference of the wheels.

16. Method as claimed in claim 14, wherein the difference between the learnt quantity and the current quantity is a standard of the wheel load.

17. Method as claimed in claim 2, wherein the system based on the evaluation of the wheel speed data is a complete DDS-system detecting tire pressure loss irrespective of the pressure measuring system (TPMS).

18. Method as claimed in claim 17, wherein a comparison is made and evaluated between the tire pressure loss determined by means of the pressure sensor system (TPMS) and the tire pressure loss detected on the basis of the DDS system.

19. Method as claimed in claim 18, wherein a compression triggered by increase of the wheel load is considered to prevail when the tire pressure loss found out on the basis of the wheel speed data is by a defined amount higher than the tire pressure loss detected on the basis of the pressure sensors (TPMS).

* * * * *